United States Patent
Pasadyn et al.

(10) Patent No.: US 6,678,570 B1
(45) Date of Patent: Jan. 13, 2004

(54) METHOD AND APPARATUS FOR DETERMINING OUTPUT CHARACTERISTICS USING TOOL STATE DATA

(75) Inventors: Alexander J. Pasadyn, Austin, TX (US); Thomas J. Sonderman, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 204 days.

(21) Appl. No.: 09/891,898

(22) Filed: Jun. 26, 2001

(51) Int. Cl.[7] ............................................. G06F 19/00
(52) U.S. Cl. ....................... 700/109; 700/110; 700/121; 29/25.01
(58) Field of Search ................................. 700/109, 110, 700/121, 192, 90, 95, 101, 117; 29/25.01; 714/45

(56) References Cited

U.S. PATENT DOCUMENTS

| | | | | |
|---|---|---|---|---|
| 5,526,293 A | * | 6/1996 | Mozumder et al. ............ 716/19 |
| 6,240,329 B1 | * | 5/2001 | Sun ............................ 700/110 |
| 6,356,858 B1 | * | 3/2002 | Malka et al. ................ 702/186 |
| 6,505,090 B1 | * | 1/2003 | Harakawa ................... 700/121 |

* cited by examiner

Primary Examiner—Jayprakash N. Gandhi
(74) Attorney, Agent, or Firm—Williams, Morgan & Amerson, P.C.

(57) ABSTRACT

A method for determining output characteristics of a workpiece includes generating a tool state trace related to the processing of a workpiece in a tool; comparing the generated tool state trace to a library of reference tool state traces, each reference tool state trace having an output characteristic metric; selecting a reference tool state trace closest to the generated tool state trace; and determining an output characteristic of the workpiece based on the output characteristic metric associated with the selected reference tool state trace. A manufacturing system includes a tool and a tool state monitor. The tool is adapted to process a workpiece. The tool state monitor is adapted to generate a tool state trace related to the processing of a workpiece in the tool, compare the generated tool state trace to a library of reference tool state traces, each reference tool state trace having an output characteristic metric, select a reference tool state trace closest to the generated tool state trace, and determine an output characteristic of the workpiece based on the output characteristic metric associated with the selected reference tool state trace.

17 Claims, 3 Drawing Sheets

METHOD AND APPARATUS FOR DETERMINING OUTPUT CHARACTERISTICS USING TOOL STATE DATA

BACKGROUND OF THE INVENTION

1. Field of the Invention

This invention relates generally to semiconductor device manufacturing and, more particularly, to a method and apparatus for determining output characteristics using tool state data.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

In some cases, a particular tool may not be well suited for automatic process control, because it is difficult to measure an output characteristic of the processed wafer to provide feedback for controlling the operating recipe. For example, copper is being used increasingly to form electrical interconnect structures in semiconductor devices, such as microprocessors. Copper has advantages over previously used interconnect materials, such as aluminum, and its use has allowed the production of higher density, lower power devices than were previously feasible. One problem area in a copper fabrication environment is the difficulty in collecting in-line metrology data related to the copper processes.

Because copper is not readily etched by chemical means, copper interconnect structures are typically formed by forming a trench in an insulating layer, electroplating a copper layer to fill the trench, and polishing the copper to remove the portion extending beyond the trench. Typical metrology techniques for measuring the outputs of the copper processing steps are destructive. For example, many tests require a cross-sectional analysis, which destroys the device or requires the use of expensive test wafers. Because, of the destructive nature of the metrology, the amount of feedback generated is not sufficient to reliably implement run to run control techniques for the copper processes.

The present invention is directed to overcoming, or at least reducing the effects of, one or more of the problems set forth above.

SUMMARY OF THE INVENTION

One aspect of the present invention is seen in a method for determining output characteristics of a workpiece. The method includes generating a tool state trace related to the processing of a workpiece in a tool; comparing the generated tool state trace to a library of reference tool state traces, each reference tool state trace having an output characteristic metric; selecting a reference tool state trace closest to the generated tool state trace; and determining an output characteristic of the workpiece based on the output characteristic metric associated with the selected reference tool state trace.

Another aspect of the present invention is seen in a manufacturing system including a tool and a tool state monitor. The tool is adapted to process a workpiece. The tool state monitor is adapted to generate a tool state trace related to the processing of a workpiece in the tool, compare the generated tool state trace to a library of reference tool state traces, each reference tool state trace having an output characteristic metric, select a reference tool state trace closest to the generated tool state trace, and determine an output characteristic of the workpiece based on the output characteristic metric associated with the selected reference tool state trace.

BRIEF DESCRIPTION OF THE DRAWINGS

The invention may be understood by reference to the following description taken in conjunction with the accompanying drawings, in which like reference numerals identify like elements, and in which.

Figure 1:
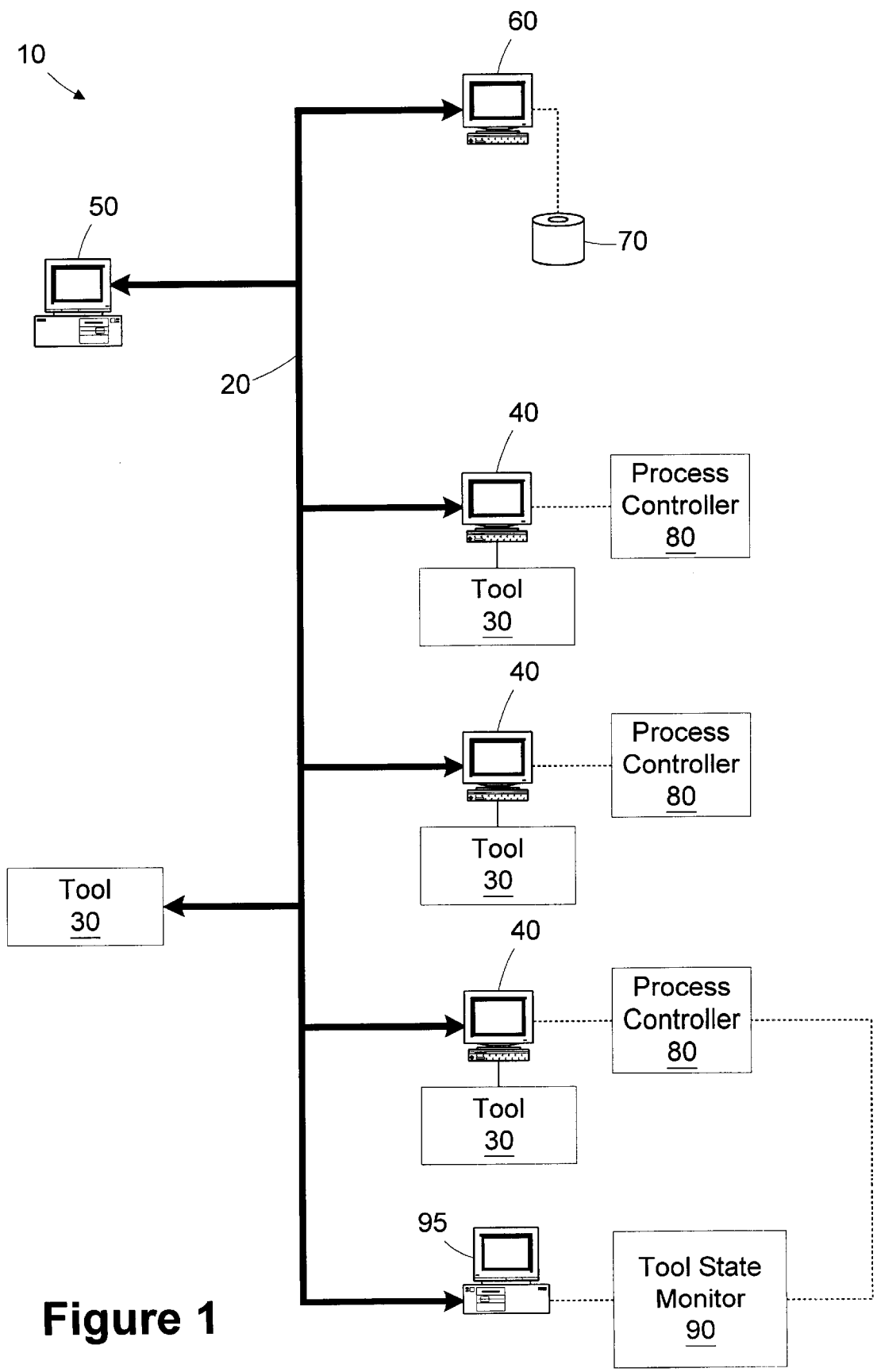
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to process semiconductor wafers, however, the invention is not so limited and may be applied to other types of manufacturing environments and other types of workpieces. A network 20 interconnects various components of the manufacturing system 10, allowing them to exchange information. The illustrative manufacturing system 10 includes a plurality of tools 30, each being coupled to a computer 40 for interfacing with the network 20. Alternatively, the tool 30 may include an integrated computer (not shown) adapted to interface with the network 20. A manufacturing execution system (MES) server 50 directs the high level operation of the manufacturing system 10 by directing the process flow of the manufacturing system 10. The MES server 50 monitors the status of the various entities in the manufacturing system 10, including the tools 30. The tools may be processing tools, such as photolithography tracks, etch tools, deposition tools, polishing tools, rapid thermal processing tools, implantation tools, etc., or metrology tools for measuring characteristics of the wafers being processed in the manufacturing system 10. A database server 60 is provided for storing data related to the status of the various entities and workpieces (e.g., wafers) in the process flow. The database server 60 may store information in one or more data stores 70. The data may include pre-process and post-process metrology data, process state data, tool state data, wafer state data, lot state data, process flow activities (e.g., scheduled maintenance events, processing routes for lots of wafers), etc. The distribution of the processing and data storage functions amongst the different computers 40, 50, 60 is generally conducted to provide independence and a central information store. Of course, a different number of computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 may include process controllers 80 that are adapted to automatically control the operating recipes of their respective tools 30. The process controller 80 may use a control model of the tool 30 to generate its prediction. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, partial least squares projection to latent structures (PLS) model. The specific implementation of the model may vary depending on the modeling technique selected. Using the control model, the process controller 80 may determine operating recipe parameters such as etch time, plasma power, temperature, pressure, reactant gas concentrations, etc. to reduce post-etch thickness variations. Other control scenarios are possible with other types of processing tools 30.

In a situation where post-process metrology data is not readily attainable (e.g., fabrication processes using copper), the process controller 80 is adapted to use tool state trace data collected for previous processing runs of the tool 30 to predict a post-process output characteristic of a current wafer. For each processing run of the tool 30, a tool state monitor 90 collects state information associated with the processing run. The particular tool state information collected depends on the specific process performed by the tool 30. For example, exemplary tool state data for a copper polishing tool may include polish time, downforce, polishing pad speed, motor current, polishing arm oscillation magnitude and frequency, slurry chemical composition, temperature, etc. Exemplary tool state data for a copper plating tool may include plating time, electrolyte bath chemical composition, electrolyte bath temperature, voltage, etc.

The tool state monitor 90 may use the tool state trace data to identify fault conditions associated with the tool 30. For example, if the tool state trace data is significantly different that what was expected for the operating recipe and environment of the tool 30, a tool fault an, may exist. An exemplary system for monitoring tool health is described in U.S. patent application No. 09/863,822, entitled "METHOD AND APPARATUS FOR MONITORING TOOL HEALTH," filed in the names of Elfido Coss Jr., Richard J. Markle, and Patrick M. Cowan, and incorporated herein by reference in its entirety.

The tool state monitor 90 is adapted to use the tool state trace data to predict an output characteristic of the wafer processed in the tool 30 and provide the approximated output characteristic to the process controller 80 for controlling the operating recipe of the tool 30. The output characteristic prediction may be performed in conjunction with or in place of the tool health evaluation.

Figure 2:
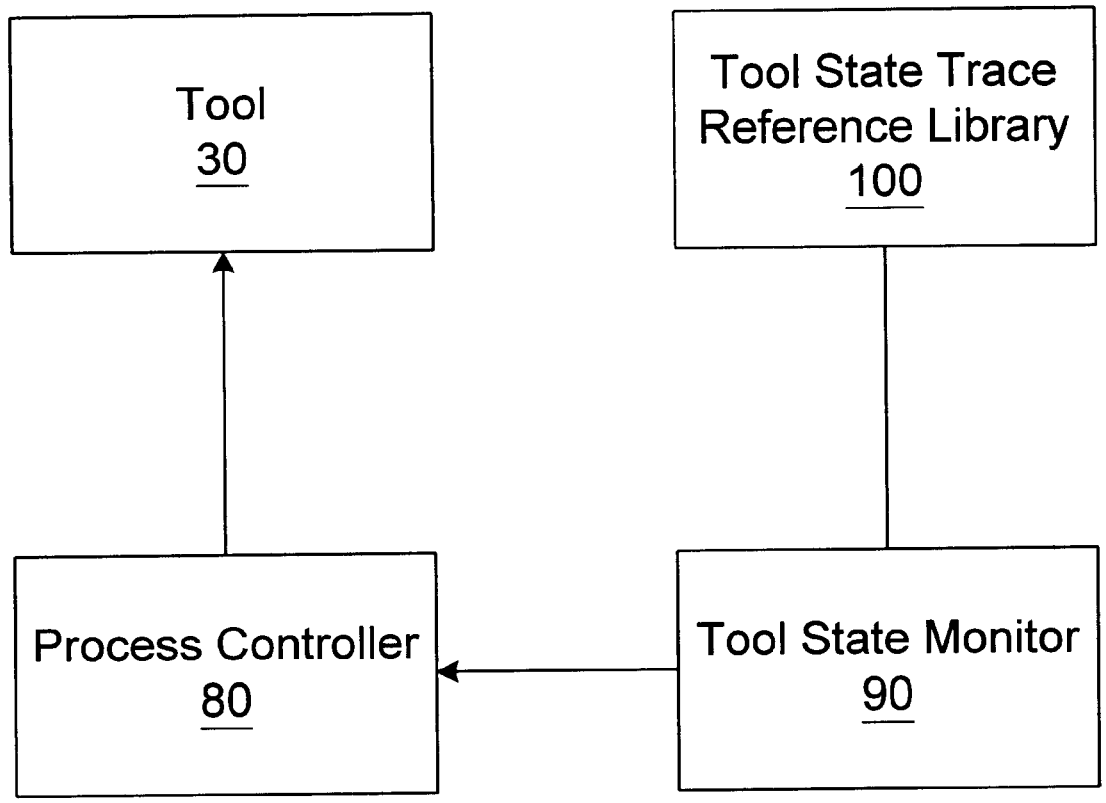
FIG. 2 is a simplified diagram of a tool state monitor interfacing with a tool and a process controller in the manufacturing system of FIG. 1.

Turning now to FIG. 2, a simplified block diagram of the tool state monitor 90 interfacing with a tool 30 is shown. The tool state monitor 90 interfaces with a tool state reference library 100. The tool state reference library 100 includes a plurality of reference sets of tool state trace data generated from previous processing runs of the tool 30. Each trace data entry may include tool operating parameters, environmental conditions, operating recipe parameters, etc. collected during the associated processing run. The trace data entry may also include mathematically processed data, such as an average tool parameter (e.g., average temperature) or an integrated parameter (e.g., integrated voltage). An exemplary commercial software application suitable for gathering and tracking tool state trace data is the ModelWare™ software application offered by Triant, Inc. of Vancouver, Canada.

Each reference trace in the tool state reference library 100 has an associated output characteristic metric. Typically, during the operation of the tool 30, certain test wafers are selected for post-processing metrology. The output characteristic metrics are generated from the post-processing metrology data collected. This post-process metrology may be destructive, and therefore only performed on a limited number of test wafers. An exemplary destructive metrology examination is a cross-sectional scanning electron microscope (SEM) analysis. The tool state reference library 100 may be periodically updated as additional metrology data is collected for test wafers processed in the tool 30.

The specific metrology data collected depends on the particular tool 30 and type of process performed. For example, output characteristic metrics for a plating tool may include process layer thickness, grain size, etc. Exemplary output characteristic metrics for a polishing tool may include planarity, process layer thickness, degree of dishing or erosion, etc.

After a wafer is processed in the tool 30, the tool state monitor 90 compares the current tool state trace data to the reference traces in the tool state reference library 100 and determines the reference trace closest to the current trace. Various techniques for matching the current trace to a reference trace are well known to those of ordinary skill in the art. For example, a minimum least squares technique may be employed.

The tool state monitor 90 passes the output characteristic metric associated with the closest matching reference trace to the process controller 80 associated with the tool 30. The process controller 80 uses the output characteristic metric as if it were an actual post-process metrology measurement of the processed wafer. The process controller 80 applies its control model of the tool to automatically update the operating recipe. Particular control techniques for implementing the process controller 80 and automatically adjusting the operating recipe parameters of the tool 30 are known to those of ordinary skill in the art. For example, if the tool 30 is a polishing tool, the process controller 80 may adjust operating recipe parameters such as polish time, downforce, polishing pad speed, polishing arm oscillation magnitude and frequency, slurry chemical composition, temperature, etc.. If the tool 30 is a plating tool, the process controller 80 may adjust operating recipe parameters such as plating time, electrolyte bath chemical composition, electrolyte bath temperature, voltage, etc.

Figure 3:
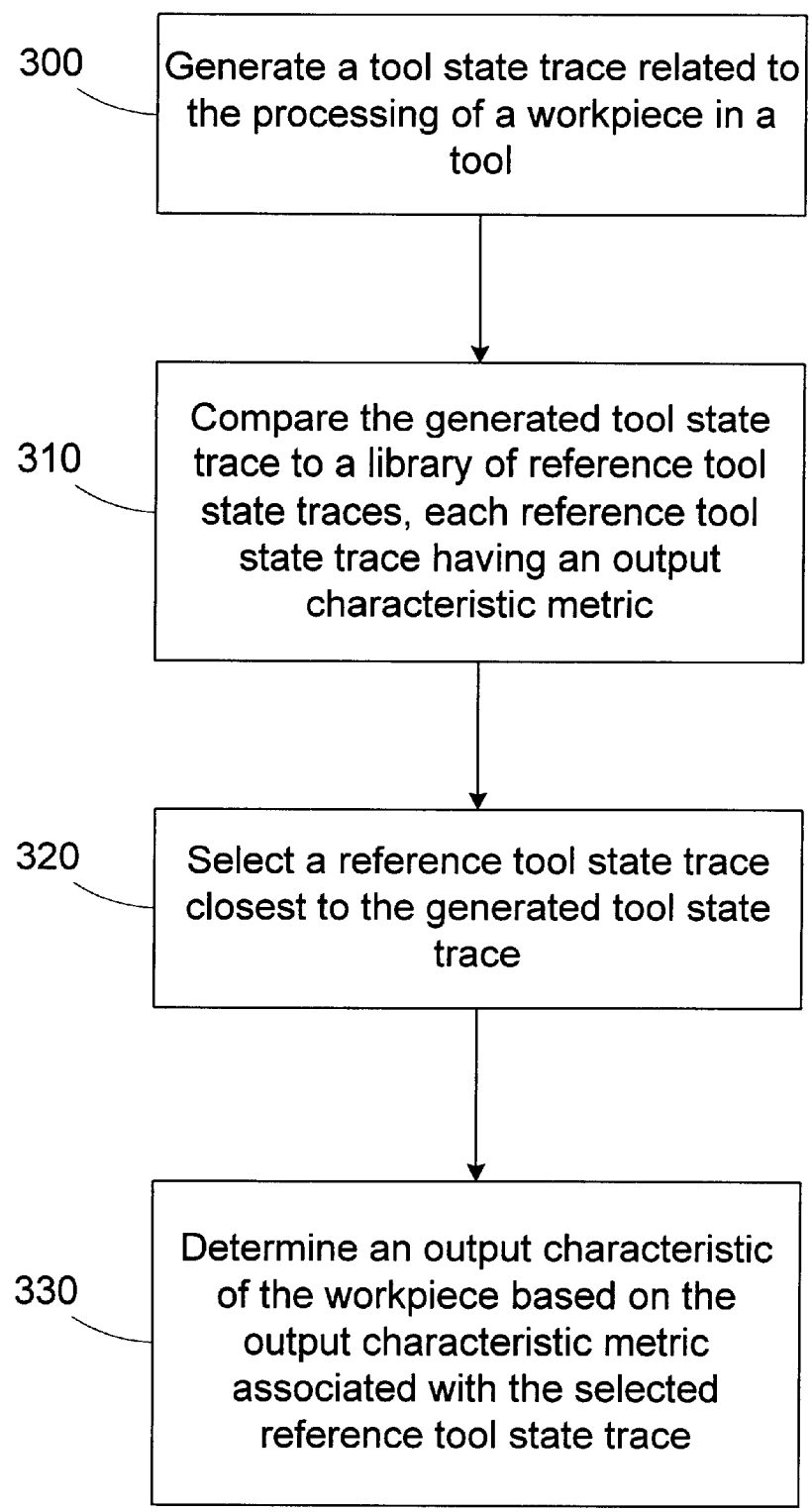
FIG. 3 is a simplified flow diagram of a method and apparatus for determining output characteristics using tool state data in accordance with another illustrative embodiment of the present invention.

Referring to FIG. 3, a simplified flow diagram of a method for controlling a tool using tool state data in accordance with another illustrative embodiment of the present invention is provided. In block 300, a tool state trace related to the processing of a workpiece in a tool is generated. In block 310, the generated tool state trace is compared to a library of reference tool state traces, each reference tool state trace having an output characteristic metric. In block 320, a reference tool state trace closest to the generated tool state trace is selected. In block 330, an output characteristic of the workpiece is determined based on the output characteristic metric associated with the selected reference tool state trace.

Using tool state trace data to approximate output characteristics of processed workpiece, e.g., wafers, allows run-to-run process control techniques to be employed in situations where post-process metrology data is difficult or impractical to gather for a large percentage of processing runs of a tool. Using output characteristic predictions to control the tool is especially useful in situations where the post-processing data may only be collected using a destructive metrology technique. In general, improved process control reduces product variability, which in turn increases product performance and profitability.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining output characteristics of a workpiece, comprising:

generating a tool state trace related to the processing of a workpiece in a tool;

comparing the generated tool state trace to a library of reference tool state traces, each reference tool state trace having an output characteristic metric;

selecting a reference tool state trace closest to the generated tool state trace; and determining an output characteristic of the workpiece based on the output characteristic metric associated with the selected reference tool state trace.

2. The method of claim 1, further comprising determining at least one operating recipe parameter of the tool based on the determined output characteristic of the workpiece.

3. The method of claim 1, further comprising:

processing a test workpiece in the tool;

generating a tool state trace related to the processing of the test workpiece in the tool;

measuring an output characteristic of the test workpiece after processing in the tool;

updating the library of reference tool state traces based on the tool state trace generated for the test workpiece and the measured output characteristic of the test workpiece.

4. The method of claim 3, wherein measuring the output characteristic further comprises measuring the output characteristic using a destructive metrology technique.

5. The method of claim 3, wherein the tool comprises a polishing tool, and measuring the output characteristic further comprises measuring at least one of a process layer thickness and a process layer dishing characteristic.

6. The method of claim 3, wherein the tool comprises a plating tool, and measuring the output characteristic further comprises measuring at least one of a process layer thickness and a process layer grain size.

7. The method of claim 2, wherein the tool comprises a polishing tool, and determining the at least one operating recipe parameter of the tool further comprises determining at least one of a polish time parameter, a downforce parameter, a polishing pad speed parameter, a polishing arm oscillation magnitude parameter, a polishing arm oscillation frequency parameter, a slurry chemical composition parameter, and a temperature parameter.

8. The method of claim 2, wherein the tool comprises a plating tool, and determining the at least one operating recipe parameter of the tool further comprises determining at least one of a plating time parameter, an electrolyte bath chemical composition parameter, an electrolyte bath temperature, and a voltage parameter.

9. A manufacturing system, comprising:

a tool adapted to process a workpiece; and a tool state monitor adapted to generate a tool state trace related to the processing of a workpiece in the tool, compare the generated tool state trace to a library of reference tool state traces, each reference tool state trace having an output characteristic metric, select a reference tool state trace closest to the generated tool state trace, and determine an output characteristic of the workpiece based on the output characteristic metric associated with the selected reference tool state trace.

10. The system of claim 9, further comprising a process controller adapted to determine at least one operating recipe parameter of the tool based on the determined output characteristic of the workpiece.

11. The system of claim 9, wherein the tool is further adapted to process a test workpiece, the system further comprises a metrology tool adapted to measure an output characteristic of the workpiece after processing in the tool, and the tool state monitor is further adapted to generate a tool state trace related to the processing of the test workpiece in the tool and update the library of reference tool state traces based on the tool state trace generated for the test workpiece and the measured output characteristic of the test workpiece.

12. The system of claim 11, wherein the metrology tool is further adapted to measure the output characteristic using a destructive metrology technique.

13. The system of claim 11, wherein the tool comprises a polishing tool, and the output characteristic measured by the metrology tool further comprises at least one of a process layer thickness and a process layer dishing characteristic.

14. The system of claim 11, wherein the tool comprises a plating tool, and the output characteristic measured by the metrology tool further comprises at least one of a process layer thickness and a process layer grain size.

15. The system of claim 10, wherein the tool comprises a polishing tool, and the process controller is further adapted to determine at least one of a polish time parameter, a downforce parameter, a polishing pad speed parameter, a polishing arm oscillation magnitude parameter, a polishing arm oscillation frequency parameter, a slurry chemical composition parameter, and a temperature parameter.

16. The system of claim 10, wherein the tool comprises a plating tool, and the process controller is further adapted to determine at least one of a plating time parameter, an electrolyte bath chemical composition parameter, an electrolyte bath temperature, and a voltage parameter.

17. A manufacturing system, comprising:

means for generating a tool state trace related to the processing of a workpiece in a tool;

means for comparing the generated tool state trace to a library of reference tool state traces, each reference tool state trace having an output characteristic metric;

means for selecting a reference tool state trace closest to the generated tool state trace; and means for determining an output characteristic of the workpiece based on the output characteristic metric associated with the selected reference tool state trace.

* * * * *